United States Patent
Ji et al.

(10) Patent No.: US 10,551,612 B2
(45) Date of Patent: Feb. 4, 2020

(54) SCANNING APPARATUS

(71) Applicants: SenPlus Inc., Suwon-si (KR); Ewha University—Industry Collaboration Foundation, Seoul (KR)

(72) Inventors: Chang-Hyeon Ji, Seoul (KR); Jong Uk Bu, Seongnam-si (KR)

(73) Assignees: SenPlus Inc., Suwon-si (KR); Ewha University—Industry Collaboration, Seoul (KR)

( * ) Notice: Subject to any disclaimer, the term of this patent is extended or adjusted under 35 U.S.C. 154(b) by 0 days.

(21) Appl. No.: 15/647,554

(22) Filed: Jul. 12, 2017

(65) Prior Publication Data

US 2018/0017783 A1 Jan. 18, 2018

(30) Foreign Application Priority Data

Jul. 13, 2016 (KR) .................. 10-2016-0088522

(51) Int. Cl.
*G02B 26/08* (2006.01)
*G02B 26/00* (2006.01)
(Continued)

(52) U.S. Cl.
CPC ....... *G02B 26/0841* (2013.01); *G02B 26/001* (2013.01); *G02B 26/105* (2013.01); *G02B 27/0031* (2013.01)

(58) Field of Classification Search
CPC .. G02B 26/00; G02B 26/001; G02B 26/0833; G02B 26/0841; G02B 26/085; G02B 26/0858; G02B 26/10; G02B 26/101; G02B 26/105; G02B 26/12; G02B 27/0031; G02B 7/1821; G02B 6/3518; G02B 6/3524; G02B 6/358; G02B 6/359; G01S 7/4817;
(Continued)

(56) References Cited

U.S. PATENT DOCUMENTS 6,388,789 B1 * 5/2002 Bernstein .............. B81B 3/0021
359/198.1
6,538,799 B2 * 3/2003 McClelland ....... G02B 26/0841
310/22

(Continued)

FOREIGN PATENT DOCUMENTS

| JP | 2014113651 A | 6/2014 |
|---|---|---|
| KR | 100636348 B1 | 10/2006 |
| KR | 1020070012649 A | 1/2007 |

OTHER PUBLICATIONS

Cho, A. et al., "Electromagnetic biaxial microscanner with mechanical amplification at resonance," Optics Express, vol. 23, No. 13, Jun. 29, 2015, Available Online Jun. 17, 2015, 11 pages.

*Primary Examiner* — Wen Huang
(74) *Attorney, Agent, or Firm* — McCoy Russell LLP

(57) ABSTRACT

Disclosed is a scanning apparatus including a substrate, an outer gimbal connected to the substrate and including an outer coil, an inner gimbal connected to the outer gimbal and including an inner coil, a mirror connected to the inner gimbal and having a reflective face formed on one side, and a magnetic assembly disposed below the substrate, wherein a spring including a plurality of strings is provided between the inner gimbal and the mirror, the plurality of strings being symmetrical to one another with respect to a longitudinal axis of the spring.

4 Claims, 11 Drawing Sheets

(51) Int. Cl.
*G02B 26/10* (2006.01)
*G02B 27/00* (2006.01)

(58) Field of Classification Search
CPC .......... B81B 7/02; H02K 33/00; H02K 33/18;
H02K 35/00; H02K 35/04; G01C 19/00
USPC ... 359/290, 291, 201.2, 198.1, 199.3, 199.1,
359/202.1, 224.1, 213.1, 200.7, 212.1,
359/212.2, 214.1, 280, 282, 302;
73/504.08, 504.09, 504.12, 504.18;
348/760; 310/36
See application file for complete search history.

(56) References Cited

U.S. PATENT DOCUMENTS

| | | | | |
|---|---|---|---|---|
| 6,593,677 B2 * | 7/2003 | Behin | .................... | G02B 6/357 |
| | | | | 310/309 |
| 8,933,862 B2 * | 1/2015 | Lapstun | ................ | G02B 26/10 |
| | | | | 345/6 |
| 9,291,816 B2 * | 3/2016 | Kurozuka | ............ | G02B 26/085 |
| 9,456,116 B2 * | 9/2016 | Lapstun | ................ | G02B 26/10 |
| 9,791,663 B2 * | 10/2017 | Pinter | .................. | G02B 26/085 |

\* cited by examiner

SCANNING APPARATUS

CROSS-REFERENCE TO RELATED APPLICATION(S)

This application claims the priority benefit of Korean Patent Application No. 10-2016-0088522 filed on Jul. 13, 2016, in the Korean Intellectual Property Office, the disclosure of which is incorporated herein by reference for all purposes.

BACKGROUND

1. Field

One or more example embodiments relate to a scanning apparatus.

2. Description of Related Art

With developments of optical device technologies, a wide variety of technologies have been developed which utilize light as a medium for transmitting information. Also, the input and output ends of various pieces of information can be processed in the form of light by scanning a beam emitted from a light source. A barcode scanner and a scanning laser display system are good examples. Such technologies have been applied to projection display systems, such as pico projector and head mounted display (HMD), with a high resolution and a high color reproduction capability.

Beam scanning technology may require a scanning mirror having various scanning speeds, scanning ranges, and angular displacements or tilting angles in accordance with an application. In related arts, the beam scanning may be realized by adjusting an incidence angle between an incident light and a reflective face of a mirror, for example, a galvanic mirror and a rotating polygon mirror to be operated.

Korean Patent No. 10-0636348 discloses a scanning apparatus.

SUMMARY

An aspect provides a scanning apparatus to prevent the damage occurring due to a stress concentrated on a central portion of a torsion beam in response to a mirror rotating.

Another aspect also provides a scanning apparatus formed to have a thickness of one side of an inner gimbal less than a thickness of another side of the inner gimbal so as to maximize the amplification rate of a mirror.

Still another aspect also provides a scanning apparatus for optimizing a structure of a magnetic assembly disposed below a gimbal to obtain a stable magnetic field with a high magnitude in a small space.

Yet another aspect also provides a scanning apparatus for amplifying an angular displacement and minimizing a deformation of a mirror due to a heat when the scanning apparatus is driven by coils formed on gimbal structures.

According to an aspect, a scanning apparatus is provided including a substrate, an outer gimbal connected to the substrate and includes an outer coil, an inner gimbal connected to the outer gimbal and includes an inner coil, a mirror connected to the inner gimbal and having a reflective face formed on one side, and a magnetic assembly disposed below the substrate, wherein a spring including a plurality of strings is provided between the inner gimbal and the mirror, the plurality of strings being symmetrical to one another with respect to a longitudinal axis of the spring.

The spring may be formed such that a gap between outermost strings of the plurality of strings at a middle of the spring is smaller than a gap between outermost strings of the plurality of strings at one end of the spring.

The spring may be formed such that a gap between outermost strings of the plurality of strings at one end of the spring adjacent to the inner gimbal is greater than a gap between outermost strings of the plurality of strings at one end of the spring adjacent to the mirror.

The inner gimbal may be formed to have the thickness of one side less than a thickness of another side connected to the mirror.

The scanning apparatus may further include a reinforcement rim circumferentially connected to the mirror.

According to another aspect, a scanning apparatus is also provided including a magnetic assembly, a mirror disposed on the magnetic assembly and configured to rotate about a first axis, an inner gimbal connected to the mirror and includes an inner coil formed on one side, and an outer gimbal including an outer coil formed on one side, and configured to support the inner gimbal and rotate about a second axis, wherein the magnetic assembly is configured to form an electromagnetic field between the outer coil and the inner coil, and the inner gimbal is formed to have a thickness of one side less than a thickness of another side connected to the mirror.

A spring including a plurality of strings may be provided between the inner gimbal and the mirror, the plurality of strings being symmetrical to one another with respect to a longitudinal axis of the spring.

The magnetic assembly may include a pole piece, an inner magnet disposed on the pole piece so as to alternate in polarity at a central portion of the pole piece, and an outer magnet disposed adjacent to the inner magnet on the pole piece so as to alternate in polarity to a polarity of the inner magnet, and the magnetic assembly may be disposed such that a direction of the electromagnetic field formed by the inner magnet and the outer magnet forms an angle relative to the first axis or the second axis.

A distance between a center of the mirror and the inner coil may be greater than a width of the inner magnet.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
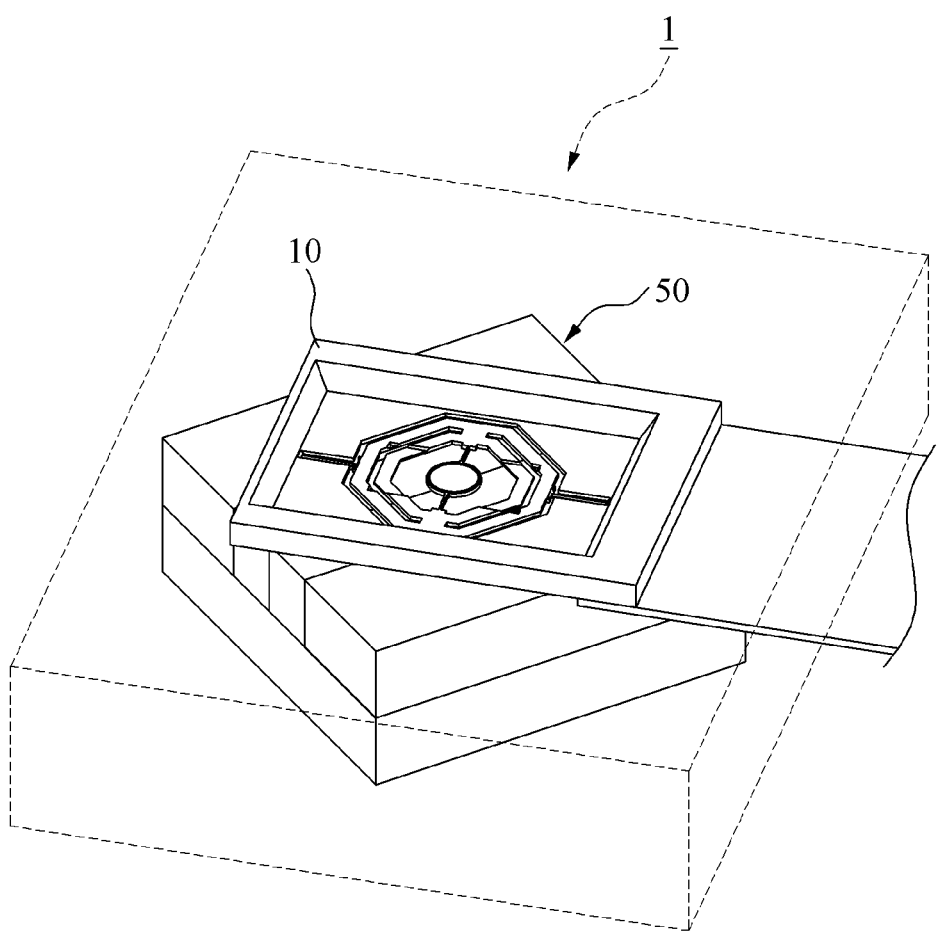
FIG. 1 is a perspective view illustrating a scanning apparatus including a magnetic assembly and a silicon substrate according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 2:
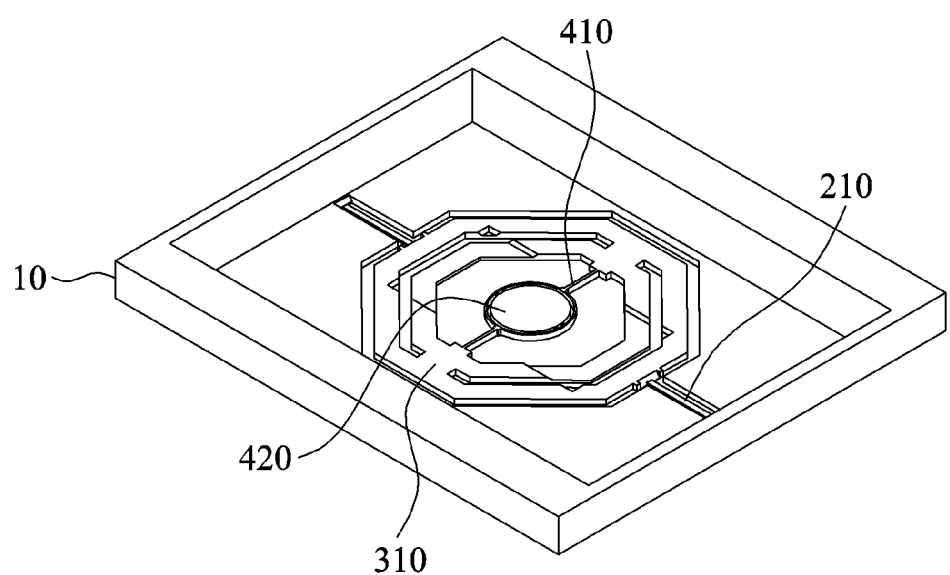
FIG. 2 is a top perspective view illustrating a scanning apparatus excluding a magnetic assembly according to an example embodiment.
Figure 3:
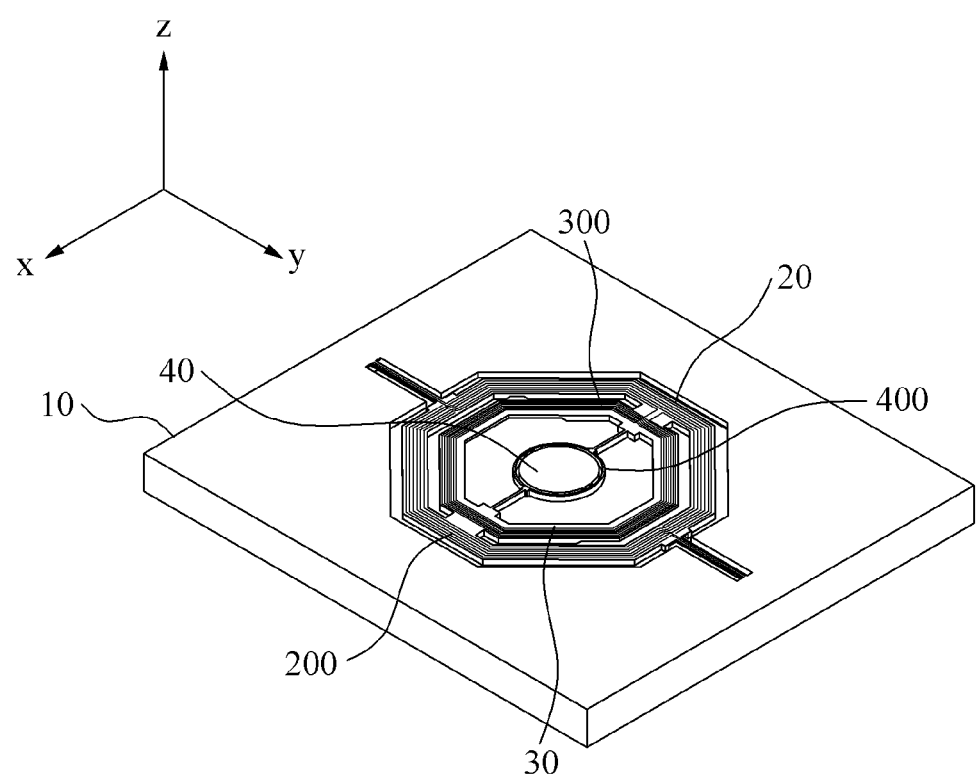
FIG. 3 is a bottom perspective view illustrating a scanning apparatus according to an example embodiment.

Referring to FIGS. 1 through 3, a scanning apparatus 1 may include a substrate 10, an outer gimbal 20 connected to the substrate 10 and including an outer coil 200, an inner gimbal 30 connected to the outer gimbal 20 and including an inner coil 300, a mirror 40 connected to the inner gimbal 30 and having a reflective face 420 on one side, and a magnetic assembly 50 disposed below the substrate 10.

The substrate 10 may include a silicon on insulator (SOI). For example, a 6-inch SOI substrate may be used for the substrate 10. Specifically, the substrate 10 may include a plurality of metal layers, and the thicknesses of a device later, a buried oxide, and a handle wafer may be 90 micrometer (μm), 1 μm, and 400 μm, respectively.

Hereinafter, a first axis and a second axis may be respectively an x axis and a y axis. For ease of description, the first axis and the second axis may also be referred to as the x axis and the y axis, respectively.

The outer gimbal 20 may be connected to the substrate 10. Specifically, the outer gimbal 20 may be connected to the substrate 10 via a first torsion beam 210 and rotate relative to a longitudinal axis of the first torsion beam 210. The longitudinal axis of the first torsion beam 210 may correspond to a second axis. That is, the outer gimbal 20 may rotate relative to the second axis, and then the mirror 40 may perform a vertical scanning as discussed below.

The outer gimbal 20 may include the outer coil 200. Specifically, the outer gimbal 20 may include the outer coil 200 on one side. Also, a path may be formed on one side of the outer gimbal 20 such that the outer coil 200 is formed on the one side.

The inner gimbal 30 may be connected to the outer gimbal 20. Specifically, the inner gimbal 30 may be connected to the outer gimbal 20 via a second torsion beam 310 and supported by the outer gimbal 20.

The inner gimbal 30 may include the inner coil 300. Specifically, the inner gimbal 30 may include the inner coil 300 on one side. Also, a path may be formed on one side of the inner gimbal 30 such that the inner coil 300 is formed on the one side.

The mirror 40 may be connected to the inner gimbal 30. Specifically, the mirror 40 may be connected to the inner gimbal 30 via a third torsion beam 410 and rotate relative to a longitudinal axis of the third torsion beam 410. The longitudinal axis of the third torsion beam 410 may correspond to a first axis as discussed below. That is, the mirror 40 may rotate relative to the first axis, and then the mirror 40 may perform a horizontal scanning. Also, the mirror 40 may include the reflective face 420 on one side. The mirror 40 may include, for example, a reflected face with a diameter of 1.2 millimeter (mm).

Also, the mirror 40 may further include a reinforcement rim 400 circumferentially connected to the mirror 40. Specifically, the reinforcement rim 400 may be provided in a shape of an oval. The reinforcement rim 400 may alleviate a dynamic deformation of the mirror 40 using a connector supporting the mirror 40 and a unique shape thereof.

The magnetic assembly 50 may be disposed below the substrate 10. Specifically, the magnetic assembly 50 may be disposed such that a direction of a magnetic field of the magnetic assembly 50 forms a constant angle relative to the longitudinal direction of the first torsion beam 210 or the second axis, or the longitudinal direction of the third torsion beam 410 or the first axis. For example, the magnetic assembly 50 may be disposed such that the direction of the magnetic field of the magnetic assembly 50 is 45 degrees (°) between the first axis and the second axis. An example of a structure of the magnetic assembly 50 that maximizes a magnitude of magnetic fields adjacent to a coil will be described later.

Figure 4:
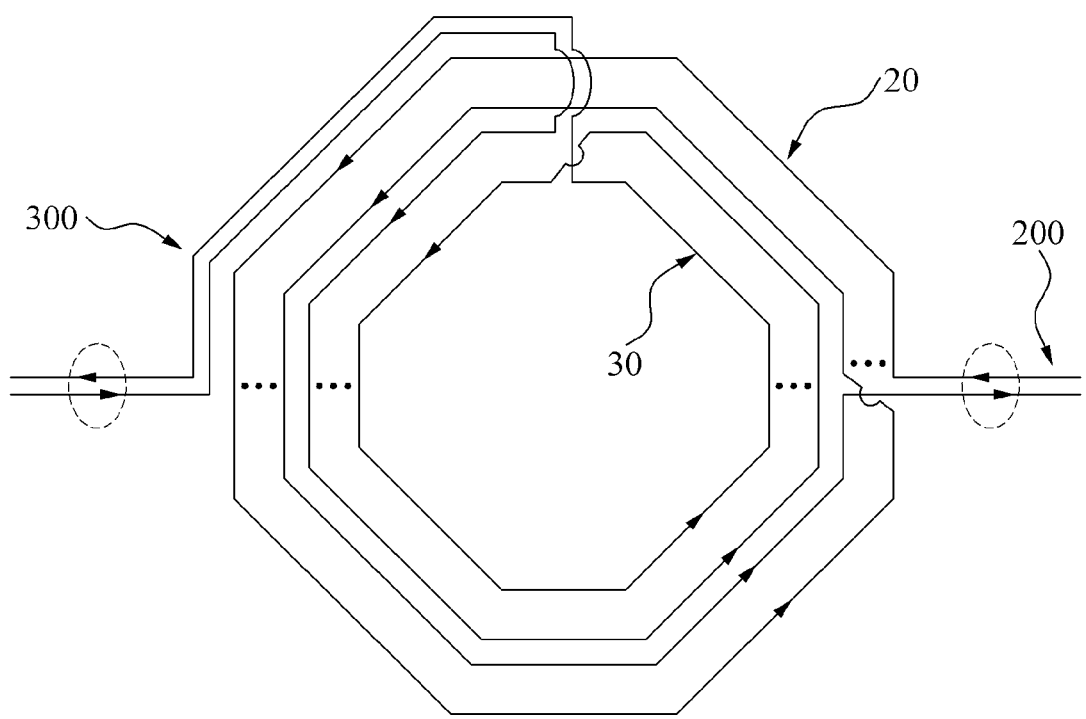
FIG. 4 is a view illustrating a coil disposed by entering through a gimbal according to an example embodiment.

Referring to FIG. 4, the outer gimbal 20 and the inner gimbal 30 may respectively include the outer coil 200 and the inner coil 300 on each one side. Also, feed lines may be formed on the one side of each of the outer gimbal 20 and the inner gimbal 30 in order to allow a current to flow therein. The feed lines may be connected to the outer coil 200 and the inner coil 300 such that the currents are supplied to the outer coil 200 and the inner coil 300 through the first torsion beam 210 and the second torsion beam 310 of the outer gimbal 20. Also, the feed lines may be designed not to affect operations of the outer gimbal 20 and the inner gimbal 30. In other words, the feed lines may be provided not to interfere with rotation of the outer gimbal 20 and the inner gimbal 30 when the outer gimbal 20 and the inner gimbal 30 are driven by rotating. Also, a number of turns of each of the outer coil 200 and the inner coil 300 may be about 6.

As discussed above, the scanning apparatus 1 may be driven by the outer coil 200 and the inner coil 300 formed separately on the outer gimbal 20 and the inner gimbal 30. Thus, a deformation of a mirror due to a heat may be minimized and an angular displacement may be amplified.

In this disclosure, the outer coil 200 and the inner coil 300 may be respectively formed on one side of the outer gimbal 20 and one side of the inner gimbal 30, and a current may be carried through the outer coil 200 and the inner coil 300 to allow the magnetic assembly 50 to form an electromagnetic field so as to provide a driving power. However, embodiments are not limited thereto. An actuation scheme based on, for example, an electrostatic force and a piezoelectricity may also be applicable.

Figure 5:
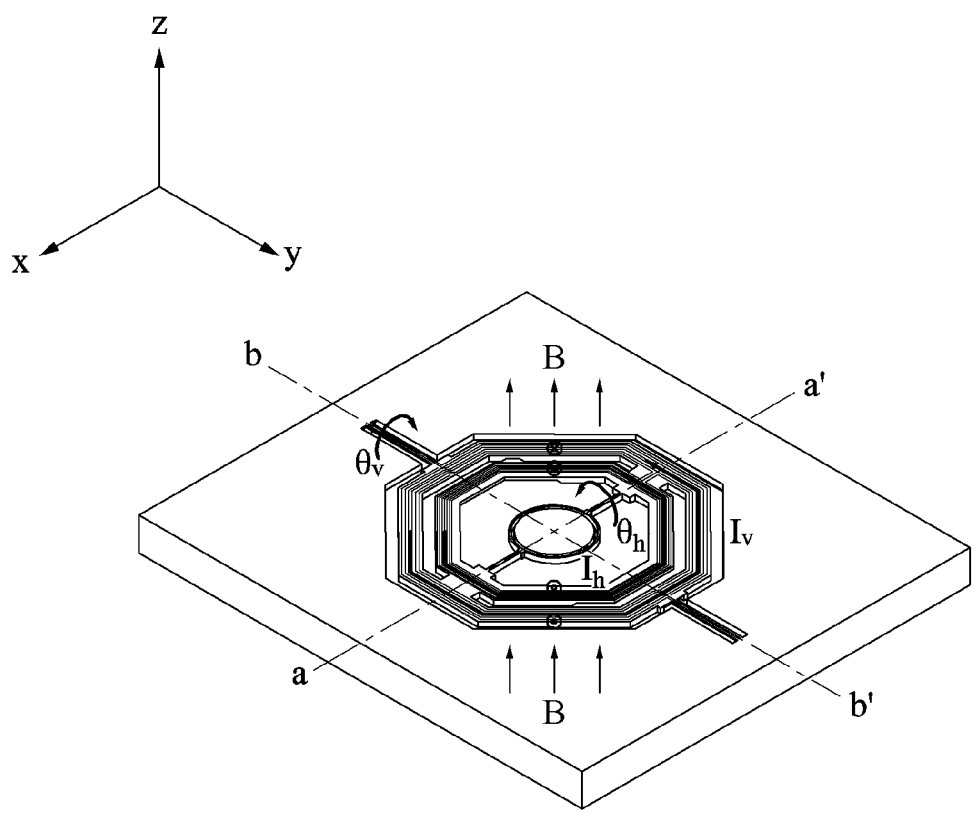
FIG. 5 is a view illustrating an operation of a magnetic assembly and a coil of a scanning apparatus forming an electromagnetic field according to an example embodiment.

Referring to FIG. 5, a vertical scanning may be performed using a current $I_v$ flowing through the outer coil 200. A current may be carried to the outer coil 200 and the inner coil 300 disposed vertical to a direction of a magnetic field B formed by the magnetic assembly 50 and an electromagnetic field is formed by the magnetic assembly 50. Through this, the mirror 40 may be driven. A rotation direction $\theta_v$ of the outer gimbal 20 may be determined based on the magnetic field B and the current $I_v$ flowing through the outer coil 200. A horizontal scanning may be performed through a rotation of the mirror 40 that is indirectly driven by applying a current $I_h$ to the inner coil 300 for resonance mode actuation. The rotation direction $\theta_h$ of the mirror 40 may be determined based on the magnetic field B and the current $I_h$ flowing through the inner coil 300. In a non-resonant operational mode, a rocking mode actuation may occur in the outer gimbal 20. Thus, the rocking mode actuation of the outer gimbal 20 may need to be minimized.

Referring back to FIGS. 2 and 3, the moment of inertia of the inner gimbal 30 may be adjusted to maximize the amplification rate of the mirror 40. For the resonance mode actuation of the outer gimbal 20 and the inner gimbal 30, the moment of inertia of the inner gimbal 30 may be adjusted to a set value by etching one side of the inner gimbal 30 in order to maximize an angular displacement of the reflective face 420. The inner gimbal 30 may be formed to have a thickness of one side less than the thickness of another side connected to the mirror 40. For example, the inner gimbal 30 may have a thickness of about 30 μm on one side and a thickness of about 90 μm on another side connected to the mirror 40. Also, a thickness of the first torsion beam 210 configured for connecting the outer gimbal 20 to the substrate 10 may be about 20 μm.

A simulation may be performed through a Harmonic analysis on the scanning apparatus 1, of which the moment of inertia of the inner gimbal 30 is adjusted, to measure the angular displacement of the mirror 40 predicted based on the above configuration. As a result of the simulation, the resonance frequency of the scanning apparatus 1 may be about 29 kilohertz (kHz), the angular displacement of the mirror 40 predicted when a peak-to-peak voltage of 15 volt ($V_{pp}$) is applied to the inner coil 200 at the resonance frequency may be ±10.8°, and a predicted scan angle may be 43.2° because an optical scan angle may be 4 times the unidirectional angular displacement of the mirror 40 due to the characteristics of the scanning apparatus 1 that reflects the input light.

Actual angular displacement measurement results of the scanning apparatus 1 will be described with reference to graphs of FIGS. 6 and 7.

Figure 6:
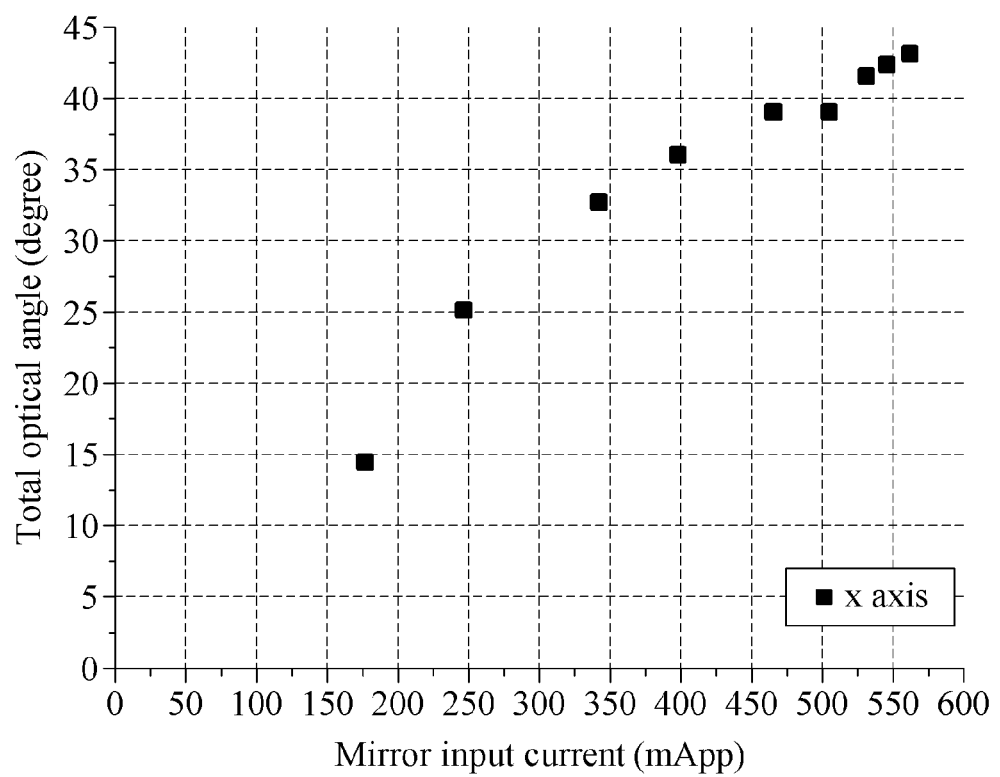
FIG. 6 is a graph illustrating an angular displacement value measured through a horizontal scanning based on an applied current in response to a resonator being driven in a process of measuring an angular displacement of a scanning apparatus according to an example embodiment.

FIG. 6 is a graph representing an angular displacement measured by performing a horizontal scanning using a sinusoidal input current at about 28.14 kHz which corresponds to the resonance frequency for a resonance mode actuation.

In this example, a voltage of 5 $V_{pp}$ is applied to the coil and a current of 563 milliampere peak-to-peak ($mA_{pp}$) is applied to the coil. Also, a horizontal optical scan angle of 43.10° is measured.

Figure 7:
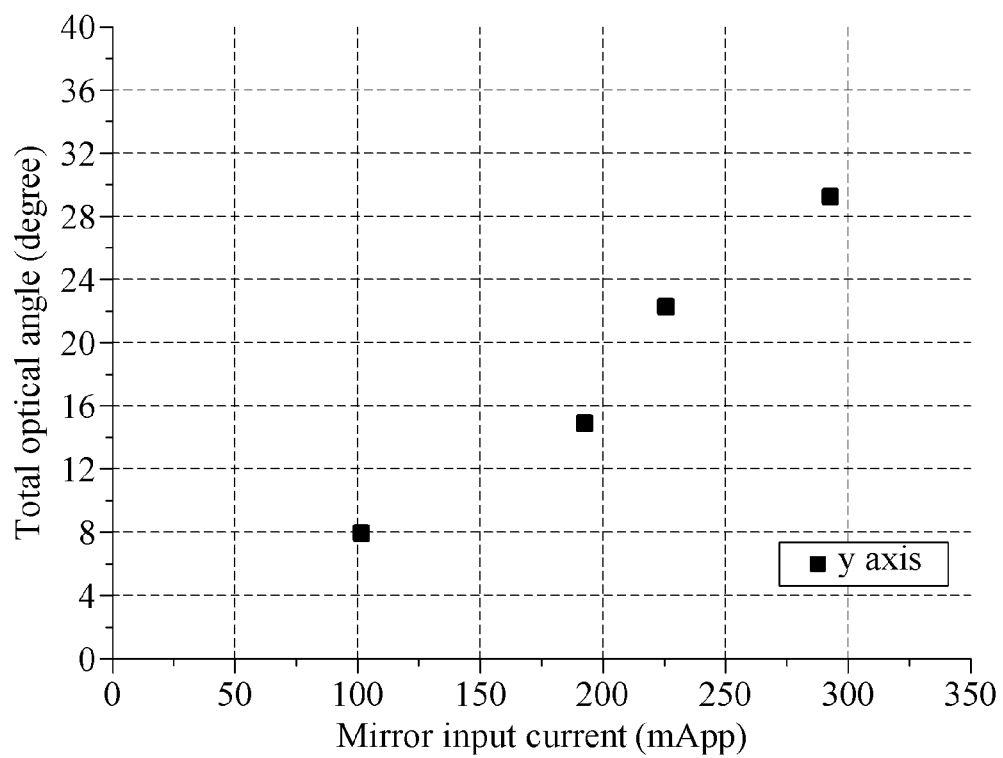
FIG. 7 is a graph illustrating an angular displacement value measured through a vertical scanning based on an applied current in response to a 60 hertz (Hz)-sine wave being forcibly applied in a process of measuring an angular displacement of a scanning apparatus according to an example embodiment.

FIG. 7 is a graph representing an angular displacement by performing a vertical scanning using a sinusoidal input current at about 60 Hz for a forced mode actuation.

In this example, a voltage of 2 $V_{pp}$ is applied to the coil and a current of 293 $mA_{pp}$ is applied to the coil. Also, a horizontal optical scan angle of 29.15° is measured.

As the actual angular displacement measurement suggests, the inner gimbal 30 may be formed to have a thickness of one side less than the thickness of another side connected to the mirror 40, thereby maximizing the amplification rate of the mirror 40, for example, the ratio of an angular displacement of the mirror 40 to an angular displacement of the inner gimbal 30, and the ratio of an angular displacement of the mirror 40 to an angular displacement of the outer gimbal 20.

Figure 8:
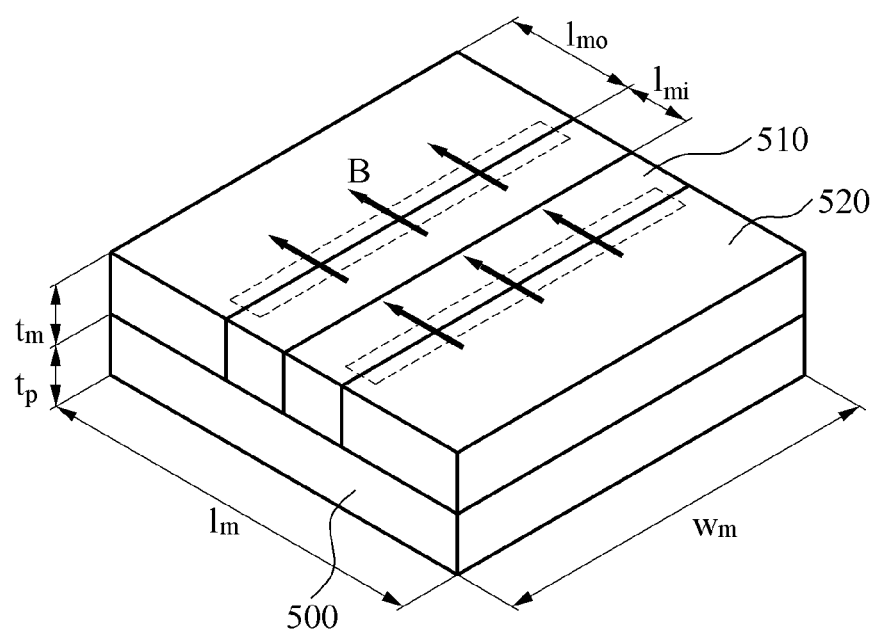
FIG. 8 is a perspective view illustrating a magnetic assembly according to an example embodiment.

Referring to FIG. 8, the magnetic assembly 50 may include a permanent magnet in which an N pole and an S pole are alternated such that an electromagnetic field of the magnetic assembly 50 is formed in the region of the outer coil 200 and the inner coil 300 on top of the magnetic assembly. The magnetic assembly 50 may include a pole piece 500, an inner magnet 510 disposed on the pole piece 500 so as to alternate in polarity at the central portion of the pole piece 500, and an outer magnet 520 disposed adjacent to the inner magnet 510 on the pole piece 500 so as to alternate in polarity to the polarity of the inner magnet 510.

Each of the inner magnet 510 and the outer magnet 520 may include a pair of magnets, and be formed in a rectangular shape. As illustrated in FIG. 8, the inner magnet 510 and the outer magnet 520 may be arranged in two parallel areas to maximize a horizontal magnetic flux density on top of the magnets.

The distance between a center of the mirror 400 and the inner coil 300 may be greater than the width $l_{mi}$ of the inner magnet 510. Accordingly, positions of the outer coil 200 and the inner coil 300 arranged on the magnetic assembly 50 may correspond to positions of the inner magnet 510 and the outer magnet 520 arranged such that the N pole and the S pole are alternated to maximize the horizontal magnetic flux density. Through this, a driving power provided to the outer coil 200 and the inner coil 300 may increase, which may also increase the actuation efficiency of the scanning apparatus 1.

Also, a width $w_m$ and a length $l_m$ of the magnetic assembly 50 may each be about 10 mm, and a magnet thickness $t_m$ and a pole piece thickness $t_p$ may each be about 1 mm. The length $l_{mi}$ of the inner magnet 510 and a length $l_{mo}$ of the outer magnet 520 may be about 1 mm and 5 mm, respectively.

The aforementioned structure of the magnetic assembly 50 may provide a horizontal magnetic field to maximize the actuation torque of the mirror 40 with respect to the first axis and the second axis. Also, the magnetic assembly 50 may be mechanically stable and easily handled during the manufacturing process as the poles are arranged in an alternating manner for individual magnets and may provide a magnetic field with a high magnitude while occupying a small space.

Figure 9:
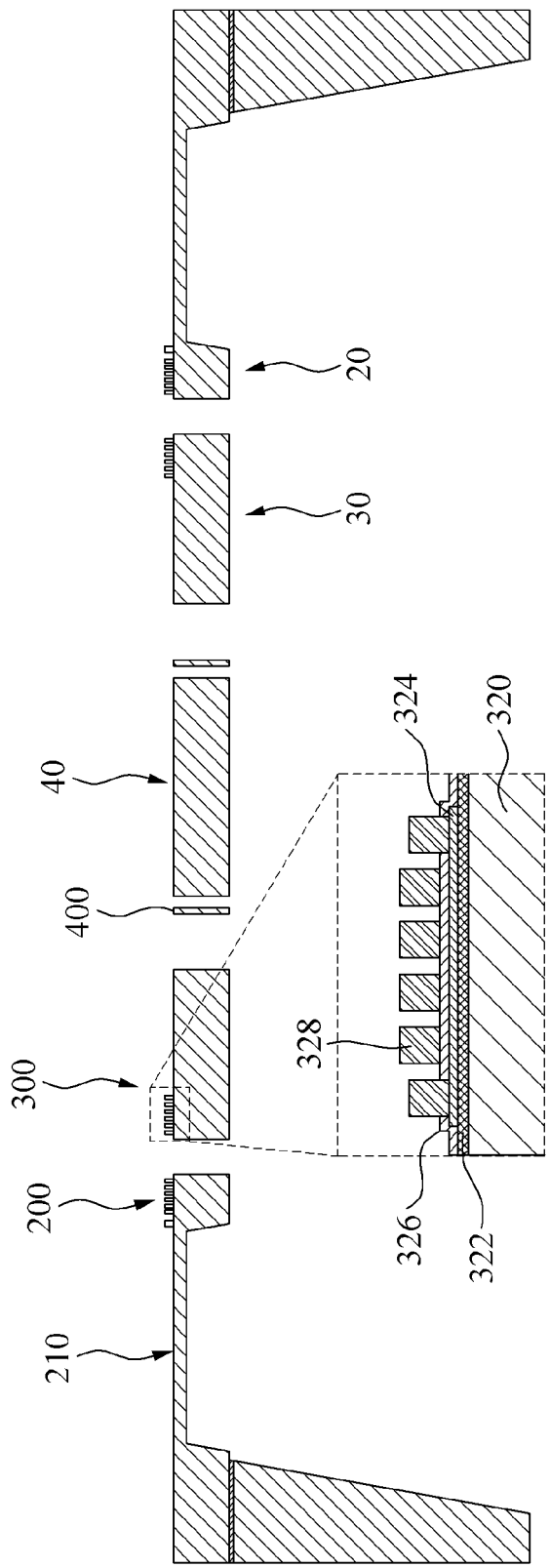
FIG. 9 is a side view illustrating a scanning apparatus including a coil disposed on a gimbal a scanning apparatus according to an example embodiment.

The manufacturing method of the scanning apparatus 1 will be described with reference to FIG. 9. The scanning apparatus 1 may be manufactured by combining surface and bulk micromachining processes. The substrate 10 may include a 6-inch SOI substrate 320. A silicon nitride 322, an aluminum 324, a silicon oxide 326 may be sequentially laminated on a silicon layer. A copper 328 may be electroplated on the silicon oxide 326. Based on the aforementioned configuration of the substrate 10, a cavity having a depth of 400 μm may be formed on a handle wafer, a buried oxide may be removed, and a trench having a depth of 70 μm may be formed on the first torsion beam 210 region at the backside of a device layer having a thickness of 90 μm.

At least one of the first torsion beam 210, the second torsion beam 310 and the third torsion beam 410 may be an elastic member. For example, the elastic member may be a spring with at least one string or a rubber band, a cable, a wire, a belt, a chain, and the like. Meanwhile, as an elastic member, FIGS. 10 and 11 illustrate that at least one of the first torsion beam 210, the second torsion beam 310 and the third torsion beam 410 is a spring, but example embodiments are not limited thereto.

Figure 10:
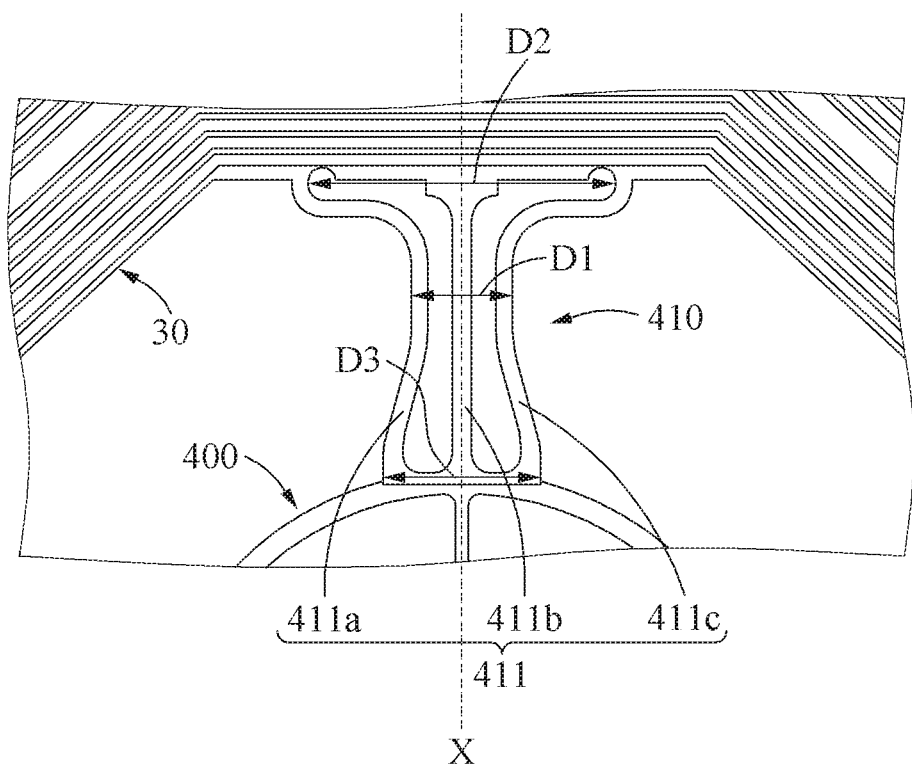
FIG. 10 is a top view illustrating an example of a portion of a scanning apparatus including a torsion beam connecting a mirror and an inner gimbal according to an example embodiment.
Figure 11:
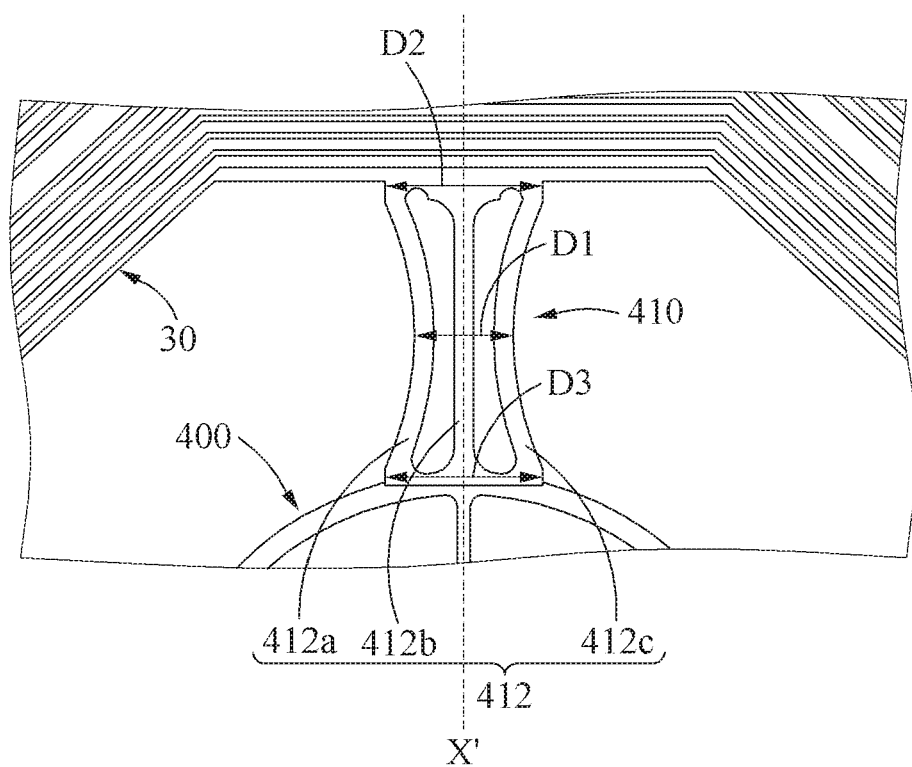
FIG. 11 is a top view illustrating another example of a portion of a scanning apparatus including a torsion beam connecting a mirror and an inner gimbal according to an example embodiment.

Referring to FIGS. 10 and 11, a longitudinal axis of the third torsion beam 410 intersects one side of each of the inner gimbal 30, a mirror 40, and a reinforcement rim 400 such that a stress may be concentrated on a central portion of the third torsion beam 410. The third torsion beam 410 may be a spring that reduces a stress concentrated on the third torsion beam 410. Based on the structure of the third torsion beam 410, a damage may decrease due to the stress concentrated on a central portion of the third torsion beam 410.

As a width of a spring 411, 412 is reduced, an efficiency of reducing the stress concentrated on the third torsion beam 410 may increase. As an alternative embodiment, the spring 411, 412 may be formed such that an effective length of the spring is increased since there is a limit in reducing the width of the spring in a manufacturing process. Specifically, the spring 411, 412 may include a plurality of strings 411a, 411b, 411c, 412a, 412b, 412c to efficiently distribute the stress throughout the spring 411 412. Also, to uniformly distribute the stress of the spring 411 412, the plurality of strings 411a, 411b, 411c, 412a, 412b, 412c may be symmetrical to one another about the longitudinal axis X, X' of the spring 411, 412.

As shown in FIGS. 10 and 11, the spring 411, 412 may be formed such that a gap D1 between outermost strings 411a, 411c, 412a, 412c of the plurality of strings 411a, 411b, 411c, 412a, 412b, 412c at a middle of the spring 411, 412 is smaller than a gap D2, D3 between outermost strings 411a, 411c, 412a, 412c of the plurality of strings 411a, 411b, 411c, 412a, 412b, 412c at one end of the spring 411 412. In a certain embodiment, as shown in FIG. 10, the spring 411 may be formed such that a gap D2 between outermost strings 411a, 411c of the plurality of strings 411a, 411b, 411c at one end of the spring 411 adjacent to the inner gimbal 30 is greater than a gap D3 between outermost strings 411a, 411c of the plurality of strings 411a, 411b, 411c at one end of the spring 411 adjacent to the mirror 40 (also refer to FIG. 3).

Based on the aforementioned form of the spring, the stress concentrated on a portion on one side of the inner gimbal 30 to which the spring is connected may be effectively distributed and not restrict a range of an angular displacement of the mirror 40.

TABLE 1

| Model | Mirror | K3 width | K3 thickness [μm] | CN [max] | 1st mode [Hz] | Resonance mode [Hz] | Nearest mode [Hz] | Defection angle [deg.] | Max. shear strass [Pa] |
|---|---|---|---|---|---|---|---|---|---|
| 15C6 | Small | Standard | 39 | 8 | 513 | 28,985(10) | 23,845 | 13.98 | 1.23E+09 |
| 15C6-1 | Small | Standard | 39 | 8 | 509 | 28,992(10) |  | 15.13 | 1.17E+09 |
| 15C6-2 | Small | Standard | 39 | 8 | 509 | 28,918(10) |  | 14.97 | 1.15E+09 |

| Model | Max. shear strain | Max. stear stress per defection angle [Patient] | Max. stear stress per defection angle [deg.] | Max. shear stress ratio [%] | Max. shear stress ratio [%] |
|---|---|---|---|---|---|
| 15C6 | 2.02E−02 | 9.03E+07 | 1.49E−03 | 100.0 | 100.0 |
| 15C6-1 | 1.64E−02 | 7.76E+07 | 1.08E−03 | 85.0 | 72.7 |
| 15C6-2 | 1.79E−02 | 7.87E+07 | 1.23E−03 | 87.2 | 82.8 |

In Table 1, 15C6 denotes a typical scanning apparatus, 15C6-1 denotes a scanning apparatus including a spring formed such that a gap between a plurality of strings at one end of the spring adjacent to the inner gimbal is greater than a gap between the plurality of strings at one end of the spring adjacent to the mirror as illustrated in FIG. 11, 15C6-2 denotes a scanning apparatus including a spring formed such that a gap between the plurality of strings on one side at a middle of the spring is smaller than a gap between the plurality of strings at one end of the spring as illustrated in FIG. 10, Max. shear stress denotes a maximum shear stress, and Max. shear strain denotes a maximum shear strain. Also, Table 1 shows results of comparisons of the maximum shear stresses and the maximum shear strains with respect to the typical scanning apparatus 15C6, the scanning apparatus 15C6-1, and the scanning apparatus 15C6-2.

The number of turns of a coil may be set to 6, a frequency of a $1^{st}$ mode may be set to about 509 to 513 Hz, a frequency of a resonance mode may be set to about 29 kHz, and then the maximum shear stresses, the maximum shear strains, angular displacements of each of the aforementioned mirrors may be compared.

As shown in Table 1, the typical scanning apparatus 15C6 has an angular displacement of 13.58°, a maximum shear stress of 1.23 gigapascal (GPa), and a maximum shear strain of 0.00202. The scanning apparatus 15C6-1 has an angular displacement of 15.13°, a maximum shear stress of 1.17 GPa, and a maximum shear strain of 0.00164. The scanning apparatus 15C6-2 has an angular displacement of 14.57°, a maximum shear stress of 1.15 GPa, and a maximum shear strains of 0.00179.

Based on the result of comparisons, when compared to the typical scanning apparatus 15C6, the maximum shear stresses of the scanning apparatus 1, 15C6-1, and 15C6-2 may be reduced by 12.8 to 14.1% and the maximum shear strains of the scanning apparatus 1, 15C6-1, and 15C6-2 may be reduced by 17.4 to 27.3%.

As such, using the spring including a plurality of strings, an effective length of a spring may be increased while a spring constant is maintained identically to that of a typical torsion beam. Through this, a stress concentrated to a central portion of a torsion beam may be efficiently distributed so as to prevent the damage due to a rotation of the mirror 40.

Hereinafter, an example of an operation of the scanning apparatus 1 will be described.

In the scanning apparatus 1, an independent 2-axis scanning may be performed based on a combination of a vertical forced mode actuation and a horizontal resonance mode actuation.

In response to an input current of 60 Hz being applied to the outer coil 200, a vertical scanning may be performed. Also, a horizontal scanning may be performed based on a resonance mode actuation of the inner gimbal 30 including the inner coil 300.

When the vertical scanning and the horizontal scanning are performed, a stress may be excessively concentrated on a central portion of a third torsion beam. In this example, the third torsion beam may include a spring including a plurality of strings. Through this, the stress may be efficiently distributed so as to prevent a damage of the third torsion beam.

The scanning apparatus 1 may prevent a damage occurring due to a stress concentrated on a central portion of a torsion beam in response to a mirror rotating. The scanning apparatus 1 may minimize a rocking mode actuation of an outer gimbal in a non-resonant operational mode. The scanning apparatus 1 may optimize a structure of a magnetic assembly disposed below a gimbal to obtain a stable magnetic field with a high magnitude in a small space. The scanning apparatus 1 may amplify an angular displacement and minimize a deformation of a mirror due to a heat when the scanning apparatus 1 is driven by coils formed on gimbal structures.

According to an aspect, it is possible to provide a scanning apparatus to prevent a damage occurring due to a stress concentrated on a central portion of a torsion beam in response to a mirror rotating.

According to another aspect, it is possible to provide a scanning apparatus formed to have a thickness of one side of an inner gimbal less than the thickness of another side of the inner gimbal so as to maximize an amplification rate of the mirror.

According to still another aspect, it is possible to provide a scanning apparatus for optimizing a structure of the magnetic assembly disposed below a gimbal to obtain a stable magnetic field with a high magnitude in a small space.

According to yet another aspect, it is possible to provide a scanning apparatus for amplifying the angular displacement and minimizing the deformation of a mirror due to a heat when the scanning apparatus is driven by coils formed on gimbal structures.

Embodiments of the scanning apparatus are not limited to the foregoing examples, and other various effects may be apparently understood by those skilled in the art based on the descriptions herein.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scanning apparatus comprising:
    a magnetic assembly;
    a mirror disposed on the magnetic assembly and configured to rotate about a first axis;
    an inner gimbal connected to the mirror and including an inner coil formed on one side; and
    an outer gimbal including an outer coil formed on one side, and configured to support the inner gimbal and rotate about a second axis,
    wherein the magnetic assembly is configured to form an electromagnetic field between the outer coil and the inner coil, and
    the inner gimbal is formed to have a thickness of one side less than a thickness of another side connected to the mirror.

2. The scanning apparatus of claim 1, wherein a spring including a plurality of strings is provided between the inner gimbal and the mirror, the plurality of strings being symmetrical to one another with respect to a longitudinal axis of the spring.

3. The scanning apparatus of claim 1, wherein the magnetic assembly includes:
    a pole piece;
    an inner magnet disposed on the pole piece so as to alternate in polarity at a central portion of the pole piece; and
    an outer magnet disposed adjacent to the inner magnet on the pole piece so as to alternate in polarity to a polarity of the inner magnet, and
    the magnetic assembly is disposed such that a direction of an electromagnetic field formed by the inner magnet and the outer magnet forms an angle relative to the first axis or the second axis.

4. The scanning apparatus of claim 3, wherein a distance between a center of the mirror and the inner coil is greater than a width of the inner magnet.

* * * * *